2,960,473
HEAT EXCHANGE COMPOSITIONS

Arthur D. Meighen and Ollie W. Chandler, Terre Haute, Ind., assignors, by mesne assignments, to Houston Chemical Corporation, New York, N.Y., a corporation of Texas No Drawing. Filed Nov. 6, 1956, Ser. No. 620,585

1 Claim. (Cl. 252—75)

Our invention relates to anti-corrosion agents. More particularly, it relates to novel anti-corrosion agents suitable for use in heat exchange media.

Both water alone and aqueous solutions of water-soluble alcohols are commonly employed as heat exchange media. One of the most extensive uses of these heat exchange media is in the cooling systems of internal combustion engines. Water alone is employed as a heat exchange medium in such cooling systems in tropical areas and during the warm months generally. Aqueous solutions of water-soluble alcohols are employed during the cold months of the year in order to afford protection against freezing for the cooling systems. However, other applications are made of these heat exchange media than in internal combustion engine cooling systems, such as stationary heat exchangers employed in industry. Our invention is useful in all these applications for inhibiting corrosion of the metals in the heat exchange system.

It has long been known that inclusion of small amounts of certain corrosion inhibiting substances in aqueous heat exchange media, such as water alone and anti-freeze compositions containing both water and water-soluble alcohol, substantially decreases the corrosion of the various metals making up the heat exchange system.

In more recent years it has been discovered that improved corrosion inhibition in such heat exchange media results from the use of several such substances as mixed corrosion inhibitors. However, the mixed corrosion inhibitors employed heretofore have certain disadvantages. For example, certain of the components often tend to lose their effectiveness before others of the mixture, with the result that the mixture no longer serves as an anti-corrosion agent. Of equal, if not greater, importance is the fact that most systems with which heat exchange media come in contact contain several different metals as well as solder. Many agents which are effective as anti-corrosion agents for a particular metal are actually corrosive against another metal of the system. This results in the necessity for including a second agent to neutralize the corrosive effect of the first agent. It may then be necessary to add still another agent to counteract some ill effect of this second agent. The correct selection of combinations of agents and the selective amounts thereof to give an effective anti-corrosion agent, therefore, requires a high degree of skill.

We have now discovered a novel anti-corrosion composition which renders heat exchange media substantially non-corrosive towards the metals commonly used in heat exchange systems and which remains stable and effective for long periods of time. This new anti-corrosion composition comprises a mixture of a 2-mercaptobenzothiazole compound, a member selected from the group consisting of alkali metal arsenites, alkali metal arsenates, alkali metal selenites, alkali metal molybdates, and mixtures thereof and a material which is effective to maintain a pH of from about 7.5 to about 10.5 in the diluted heat exchange composition. The heat exchange compositions which employ our new synergistic anti-corrosion compositions herein described may contain as the major ingredient water, water and a water-soluble alcohol freezing point depressant, or the water-soluble alcohol freezing point depressant alone suitable for use in heat exchange systems when diluted with water to an alcohol content of from about 10 to about 60% by volume, as for example in automotive cooling systems.

The water-soluble alcohols which can be inhibited by our new anti-corrosion compositions are selected from the class consisting of the low molecular mono- and dihydroxyaliphatic alcohols, commonly employed as freezing point depressants in anti-freeze compositions, such as methanol, ethanol, ethylene glycol, and propylene glycol.

The alkali metal arsenite, arsenate, selenite or molybdate used in our composition can be the corresponding sodium, potassium or other alkali metal salts. We have, for example, found the sodium and potassium salts to be equally effective. Either 2-mercaptobenzothiazole or one of its alkali metal or ammonium salts can be used satisfactorily.

We have found that a composition including a mixed corrosion inhibitor of these two specified ingredients demonstrates synergistic action in the control of corrosion in heat exchange media. However, in order to maintain their anti-corrosive effectiveness over prolonged periods of use we have found it necessary to include in our composition an alkaline material which is effective to maintain the pH of the heat exchange media between about 7.5 and 10.5. We have found that a number of common materials are effective to maintain the pH within this range. They include the alkali metal borates, such as sodium metaborate, potassium metaborate, sodium tetraborate, and potassium tetraborate, calcium borate, the dibasic alkali metal phosphates, the 2-hydroxyalkylammonium borates, such as 2-hydroxyethylammonium borate, tris(2-hydroxyethyl)ammonium borate and (hydroxy-$t$-butyl)ammonium borate, the 2-hydroxyalkylamines, such as 2-hydroxyethylamine and tris(2-hydroxyethyl)amine, and urea.

We have found that our new synergistic mixed corrosion inhibitor can be composed of the three ingredients in any of the following percentage compositions: from 1.6% to 62.5% of a 2-mercaptobenzothiazole compound, from 3.8% to 80.0% of a member selected from the group consisting of alkali metal arsenites, alkali metal arsenates, alkali metal selenites, alkali metal molybdates, and mixtures thereof, and from 11.8% to 93.0% of a material effective to maintain a pH of from about 7.5 to 10.5 in an aqueous solution of the composition. Any of the above compositions of our new inhibitor are suitable for incorporatin in any aqueous heat exchange medium to inhibit the corrosive effects thereof.

However, we prefer to use our new mixed corrosion inhibitor composed of the three ingredients in the following percentage compositions: from about 10% to about 17% of a 2-mercaptobenzothiazole compound, from about 20% to about 33% of a member selected from the group consisting of alkali metal arsenites, alkali metal arsenates, alkali metal selenites, alkali metal molybdates, and mixtures thereof, and from about 50% to about 67% of a material effective to maintain a pH of from about 7.5 to about 10.5 in an aqueous solution of the composition. We have found that the inclusion of from about 0.5% to about 3.0% of our preferred mixed corrosion inhibitor in a water-soluble alcohol anti-freeze composition, based on the weight of the water-soluble alcohol used, results in an anti-freeze composition substantially non-corrosive to the metals commonly used in automotive cooling systems when the anti-freeze compositions are diluted with water to a water-soluble alcohol content of from about 10% to about 60% by volume. Moreover, such anti-freeze compositions remain substantially non-corrosive through prolonged use. Lower concentrations than those indicated can be included in the anti-freeze and render the compositions non-corrosive, but the compositions may not remain substantially non-corrosive for an entire 6 month season in use, depending upon the extent and vigor of the use.

Furthermore, we have found that the inclusion of our preferred mixed corrosion inhibitor in water alone or anti-freeze compositions of water and water-soluble alcohols already adjusted to the dilution for use in amounts of from about 0.1% to about 0.6% based on the weight of the water or diluted composition will render such water or diluted anti-freeze compositions substantially nonsolder and steel discs had a surface area of 17.0 square cms., while the aluminum and cast iron discs had an area of 22.8 square cms. The amount of each corrosion inhibiting ingredient is stated as the concentration in ethylene glycol, which was diluted with water to an ethylene glycol concentration of 20% by volume for testing. From these data it is seen that the mixed corrosion inhibitor of the first formula is composed of 14.23% sodium 2-mercaptobenzothiazole, 28.56% sodium arsenite, and 57.21% sodium tetraborate included in the glycol at a concentration of 1.75% by weight and in the diluted antifreeze at a concentration of 0.35% by weight. As the results are stated in the table, a "+" indicates that an increase in the weight of the metal test disc was observed. The weights not thus marked represent the loss of metal in mgs. from the test discs.

*Table I*

| Formula | Weight Loss, mgs. | | | | | |
|---|---|---|---|---|---|---|
| | Alum. | Brass | Copper | Solder | Steel | Cast Iron |
| 0.25% Sodium 2-mercaptobenzothiazole<br>0.5% Sodium arsenite<br>1.0% Sodium tetraborate | +2.1 | +1.3 | +1.0 | 5.4 | 4.2 | 5.7 |
| 0.25% Sodium 2-mercaptobenzothiazole<br>0.5% Sodium selenite<br>1.0% Sodium metaborate | 0 | +1.3 | 0 | +0.8 | +1.5 | +1.7 |
| 0.25% Sodium 2-mercaptobenzothiazole<br>0.5% Sodium molybdate<br>1.0% Sodium metaborate | +1.6 | +1.3 | +0.1 | +0.6 | +2.0 | +0.8 |
| 0.25% Sodium 2-mercaptobenzothiazole<br>0.5% Sodium arsenate<br>1.0% Sodium metaborate | 1.2 | +1.0 | 0 | +1.8 | +1.2 | +1.1 |
| 0.25% Sodium 2-mercaptobenzothiazole<br>0.5% Sodium arsenite<br>1.0% Sodium metaborate | +2.7 | 0.3 | 0.9 | 1.8 | 0.5 | +1.4 |
| 0.5% Sodium selenite | 11.9 | 0.2 | 0 | 4.7 | 1.8 | 42.5 |
| 0.5% Sodium molybdate | 16.4 | +0.4 | +1.0 | +0.1 | 4.6 | 255.8 |
| 0.5% Sodium arsenate | 38.6 | +0.4 | +0.4 | 8.4 | 6.7 | 303.0 |
| 0.5% Sodium arsenite | 10.4 | 3.0 | 2.1 | 4.0 | 2.2 | 148.0 |
| 0.25% Sodium 2-mercaptobenzothiazole | +3.5 | 5.6 | 4.3 | 3.9 | 225.0 | 85.9 |
| 0.25% Sodium 2-mercaptobenzothiazole<br>1.0% Sodium tetraborate | 11.4 | +0.8 | +0.6 | 7.9 | 161.5 | 198.7 |
| 1.0 Sodium metaborate | +5.6 | +0.6 | 0.5 | 2.6 | +1.1 | 131.5 |
| None | 14.9 | 0.6 | 1.2 | 13.7 | 632.3 | 581.2 | corrosive for prolonged periods of use. Thus, our new mixed corrosion inhibitor can be used to inhibit corrosion by water in any type of heat exchange system, to inhibit corrosion by already diluted anti-freeze compositions, and to re-inhibit anti-freeze compositions in which the corrosion inhibitors have become exhausted. For purposes of inclusion in water and diluted anti-freeze compositions our new mixed corrosion inhibitor can conveniently be packaged as a concentrated aqueous solution for ready addition to such heat exchange media.

The following table shows a comparison of our new corrosion inhibited anti-freeze composition with compositions containing the individual synergistic corrosion inhibiting compounds. Table I reports the results of static corrosion tests of two weeks duration conducted at approximately 160° F. using test discs of all metals commonly used in heat exchange system. The brass, copper, Table II demonstrates the equivalency of alkali metal arsenites, alkali metal arsenates, alkali metal selenites and alkali metal molybdates in our anti-corrosive composition used in a tap water medium. In Table II are set forth the results of two-week static corrosion tests conducted in the same manner as set forth above, except that a tap water medium is used. The results are recorded as weight loss in mgs. of each test disc. The amounts of each ingredient are stated as the concentration in tap water.

*Table II*

| Formula | Medium | Weight Loss, mgs. | | | | | |
|---|---|---|---|---|---|---|---|
| | | Alum. | Brass | Copper | Solder | Steel | Cast Iron |
| None | Tap water | 35.0 | +3.3 | 4.9 | 25.5 | 339.8 | 251.4 |
| 0.05% Sodium 2-mercaptobenzothiazole, 0.2% Sodium metaborate plus: | | | | | | | |
| 0.1% Sodium arsenite | do | 26.5 | 2.0 | 1.0 | 8.5 | +0.4 | 10.7 |
| 0.1% Sodium arsenate | do | 24.9 | 1.1 | 1.1 | 6.6 | +1.7 | +2.5 |
| 0.1% Sodium selenite | do | 18.4 | 2.8 | 5.8 | 6.9 | +1.0 | +1.6 |
| 0.1% Sodium molybdate | do | 15.3 | 0.3 | 0.6 | 7.7 | +2.0 | 2.7 |

In Table III the results of two-week static tests conducted in the same manner as set forth in Table II above are recorded in which various of the materials effective to maintain a pH of from 7.5 to 10.5 are incorporated in our anti-corrosive compositions in tap water. The amounts of each ingredient are stated as the concentration in tap water, and the results are reported as weight loss in mgs. of each metal test disc.

Table III

| Formula | Weight Loss, mgs. | | | | | |
|---|---|---|---|---|---|---|
| | Alum. | Brass | Copper | Solder | Steel | Cast Iron |
| 0.05% Sodium 2-mercaptobenzothiazole, 0.1% Sodium arsenite, plus: | | | | | | |
| 0.2% Calcium borate | +1.5 | +0.4 | +0.3 | 1.9 | +0.8 | +2.0 |
| 0.2% Disodium acid phosphate | 7.0 | 0.1 | 0.8 | 4.1 | 0.7 | 0.0 |
| 0.2% Urea | 9.4 | 0.6 | 1.6 | 5.6 | 0.8 | 0.7 |
| 0.2% 2-Hydroxyethylamine | 38.1 | 1.5 | 2.2 | 8.8 | 0.8 | 0.0 |
| 0.2% Tris (2-hydroxyethyl)amine | 13.7 | 1.2 | 1.6 | 4.1 | 0.8 | +0.2 |
| 0.2% (Hydroxy-t-butyl)amine | 21.3 | 0.5 | 0.6 | 5.3 | 0.4 | +0.3 |
| 0.2% 2-Hydroxyethylammonium borate | 31.3 | 0.8 | 0.4 | 3.0 | +0.6 | +0.8 |
| 0.2% Tris(2-hydroxyethyl)ammonium borate | 10.1 | 0.0 | 0.3 | 3.1 | 0.8 | +0.6 |
| 0.2% (Hydroxy-t-butyl)ammonium borate | 46.2 | 0.5 | 0.8 | 4.1 | +0.2 | +1.2 |

In Table IV are set forth the results of two-week static tests on the same size and type of metal test discs as described above in which various of the materials effective to maintain a pH of from 7.5 to 10.5 in our diluted anti-freeze and for use in our new compositions are incorporated. The amounts of each ingredient are stated as the concentration in the water-soluble alcohol which is diluted for testing. The results are reported as weight loss in mgs. of the metal test discs.

Table IV

| Formula | Medium | Weight Loss, mgs. | | | | | |
|---|---|---|---|---|---|---|---|
| | | Alum. | Brass | Copper | Solder | Steel | Cast Iron |
| (*) | | | | | | | |
| 0.5% Sodium arsenite and 0.25% Sodium 2-mercapto-benzothiazole plus: | | | | | | | |
| 1.0% Potassium tetraborate | 20% Methanol | 7.7 | 0.8 | 0.9 | 6.0 | 0.5 | 0.9 |
| 1.0% Tris (2-hydroxyethyl)-amine | 20% Glycol | 3.6 | 0.8 | 0.2 | 4.7 | 1.6 | 3.8 |
| 1.0% Urea | do | 1.1 | +0.1 | +0.3 | 1.0 | +1.4 | 0.7 |
| 1.0% Tris (2-hydroxyethyl)-ammonium borate | 20% Methanol | 1.5 | +0.3 | +0.2 | 1.9 | 1.0 | 5.4 |
| 1.0% Sodium tetraborate | 50% Methanol | +5.6 | 2.5 | 2.3 | 4.8 | No Change | +1.3 |
| 1.0% (Hydroxy-t-butyl)-ammonium borate | 20% Methanol | +1.5 | 0.5 | 1.3 | 3.8 | 0.1 | No Change |

*Based on the weight of water-soluble alcohol used.

The following table demonstrates the effectiveness of our new anti-corrosive composition when the components are varied over a wide range of percentage compositions in tap water. The amounts of each ingredient are stated as the concentration in water, and the results of the two-week static corrosion tests are reported as weight loss in mgs. of each test disc.

Table V

| Formula | Medium | Weight Loss, mgs. | | | | | |
|---|---|---|---|---|---|---|---|
| | | Alum. | Brass | Copper | Solder | Steel | Cast Iron |
| 0.1% Sodium 2-mercaptobenzothiazole<br>0.02% Sodium arsenite<br>0.4% Sodium metaborate | Tap Water | 34.5 | 1.7 | 1.4 | 7.8 | 3.4 | +2.3 |
| 0.01% Sodium 2-mercaptobenzothiazole<br>0.2% Sodium arsenite<br>0.04% Sodium metaborate | do | 20.7 | 1.8 | 2.4 | 3.0 | +0.2 | 1.3 |
| 0.1% Sodium 2-mercaptobenzothiazole<br>0.2% Sodium arsenite<br>0.04% Sodium metaborate | do | 8.5 | 1.5 | 1.2 | 5.0 | +0.2 | 1.1 |

The following table shows the results obtained with our mixture of anti-corrosion agents when used in an aqueous methanol medium compared with the results obtained using a mixture without one or the other of the major components. The results of the two-week static conversion tests are reported as above.

Table VI

| Formula | Medium | Weight Loss, mgs. | | | | | |
|---|---|---|---|---|---|---|---|
| | | Alum. | Brass | Copper | Solder | Steel | Cast Iron |
| 0.32% Sodium 2-mercaptobenzothiazole<br>0.5% Sodium arsenite<br>1.0% Sodium tetraborate | 20% Methanol | 5.3 | 0.7 | 1.2 | 2.7 | 0 | +3.5 |
| 0.5% Sodium arsenite<br>1.0% Sodium tetraborate | do | 0.3 | 0.8 | 2.5 | 1.7 | 13.0 | 166.4 |
| 0.32% Sodium 2-mercaptobenzothiazole<br>1.0% Sodium tetraborate | do | 17.2 | 1.6 | 2.4 | 2.0 | 16.4 | 352.1 |

In Table VII are set forth the results of 60-day circulating corrosion tests of our new anti-freeze compositions as compared to such a composition without a material effective to maintain a pH of from about 7.5 to about 10.5. In these tests six sets of metal test discs of the same description as those used in the static tests are subjected to a continuously circulated medium at approximately 160° F. and the sets withdrawn at ten-day intervals. The amounts of each ingredient are stated as the concentration in the water-soluble alcohol which is diluted for testing. Weight losses of the discs are recorded in mgs.

We do not intend to be limited to the specific amounts, procedures, and materials disclosed in the above tables. The scope of our invention is as set forth in this specification and the appended claim.

This application is a continuation-in-part of our now abandoned application Serial No. 403,627, filed January 12, 1954.

Now having described our invention, what we claim is:

An anti-freeze composition comprising a water-soluble alcohol, selected from the class consisting of the low-molecular mono- and di-hydroxy aliphatic alcohols, and from about 0.5% to about 3.0% based on the weight of the water-soluble alcohol of an anti-corrosion agent consisting essentially of from about 10% to about 17% by weight sodium 2-mercaptobenzothiazole, from about 20% to about 33% by weight sodium arsenite, and from about 50% to about 67% by weight sodium metaborate.

Table VII

| Formula | Medium | Days Run | Weight Loss, mgs. | | | | | |
|---|---|---|---|---|---|---|---|---|
| | | | Alum. | Brass | Copper | Solder | Steel | Cast Iron |
| (*) 0.5% Sodium arsenite<br>0.25% Sodium 2-mercaptobenzothiazole (test terminated). | 20% Ethylene Glycol | 10<br>20<br>30<br>40 | 3.1<br>17.5<br>17.6<br>37.2 | .8<br>.7<br>1.0<br>2.8 | .4<br>1.2<br>2.2<br>3.1 | 2.4<br>7.3<br>4.2<br>12.6 | 0.0<br>1.7<br>50.3<br>521.8 | 16.0<br>77.2<br>324.7<br>497.4 |
| 0.5% Sodium arsenite<br>0.25% Sodium 2-mercaptobenzothiazole | do | 10<br>20<br>30<br>40<br>50<br>60 | 0.2<br>67.5<br>67.9<br>86.6<br>78.0<br>104.4 | 1.1<br>1.2<br>1.7<br>-2.0<br>3.8<br>5.6 | 1.7<br>1.3<br>1.4<br>-2.4<br>6.0<br>4.3 | 6.3<br>9.2<br>8.6<br>-5.8<br>13.4<br>11.5 | 0.6<br>0.4<br>0.5<br>0.2<br>3.2<br>12.2 | 1.4<br>+1.1<br>0.1<br>4.1<br>6.0<br>25.5 |
| 0.5% Sodium arsenite<br>1.0% Sodium metaborate<br>0.25% Sodium 2-mercaptobenzothiazole | 50% Ethylene Glycol | 10<br>20<br>30<br>40<br>50<br>60 | 3.1<br>+0.7<br>1.9<br>+1.4<br>+2.6<br>0.6 | 1.9<br>0.5<br>1.1<br>0.6<br>0.8<br>2.0 | 1.7<br>1.6<br>2.1<br>1.7<br>1.1<br>1.7 | 8.2<br>2.5<br>5.5<br>3.0<br>3.7<br>13.2 | 0.7<br>0.6<br>+0.4<br>0.4<br>0.1<br>0.3 | 1.0<br>+0.2<br>+2.1<br>0.0<br>0.8<br>0.5 |
| 0.5% Sodium arsenite<br>1.0% Sodium tetraborate<br>0.25% Sodium 2-mercaptobenzothiazole | 20% Methanol | 10<br>20<br>30<br>40<br>50<br>60 | 19.3<br>38.5<br>56.4<br>73.8<br>103.0<br>122.9 | 0.3<br>1.8<br>1.2<br>1.2<br>2.2<br>1.3 | 0.2<br>1.5<br>2.1<br>2.6<br>4.7<br>4.2 | 6.9<br>7.1<br>4.8<br>2.9<br>2.9<br>2.3 | 0.3<br>0.2<br>1.9<br>1.0<br>1.0<br>2.2 | 4.4<br>2.9<br>1.1<br>3.5<br>5.7<br>8.0 |

*Based on the weight of water-soluble alcohol used.

References Cited in the file of this patent

UNITED STATES PATENTS

| | | |
|---|---|---|
| 2,147,409 | Lamprey | Feb. 14, 1939 |
| 2,534,030 | Keller | Dec. 12, 1950 |
| 2,721,183 | White et al. | Oct. 18, 1955 |
| 2,755,170 | Stubblefield | July 17, 1956 |
| 2,815,328 | Green | Dec. 3, 1957 |